Oct. 28, 1930. H. L. BLYDENBURGH 1,779,583
DRIVE CONTROL FOR MOTOR DRIVEN LAWN MOWERS
Filed Sept. 26, 1927 2 Sheets-Sheet 1
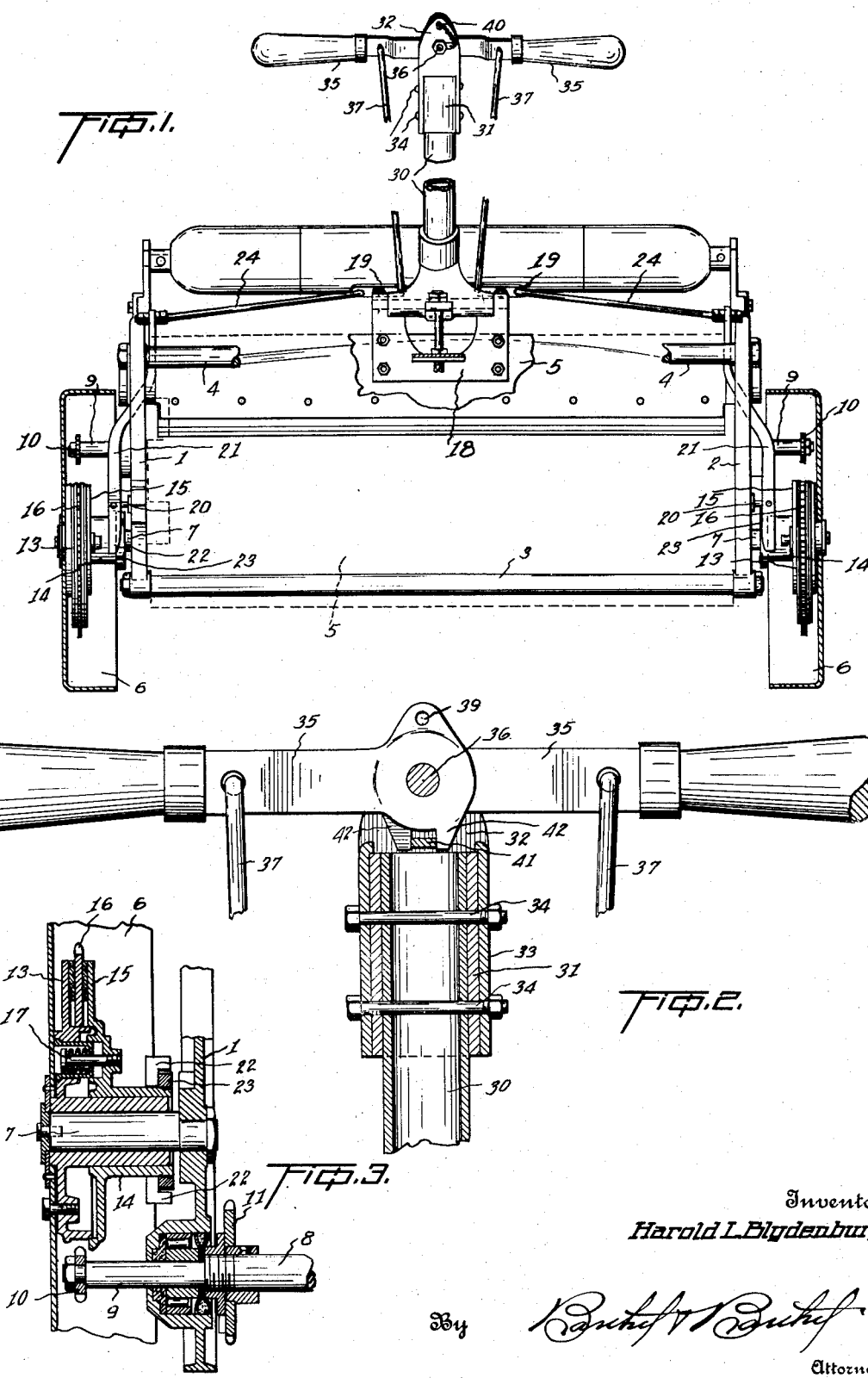
Inventor
Harold L. Blydenburgh
By
Attorney Oct. 28, 1930.  H. L. BLYDENBURGH  1,779,583
DRIVE CONTROL FOR MOTOR DRIVEN LAWN MOWERS
Filed Sept. 26, 1927  2 Sheets-Sheet 2
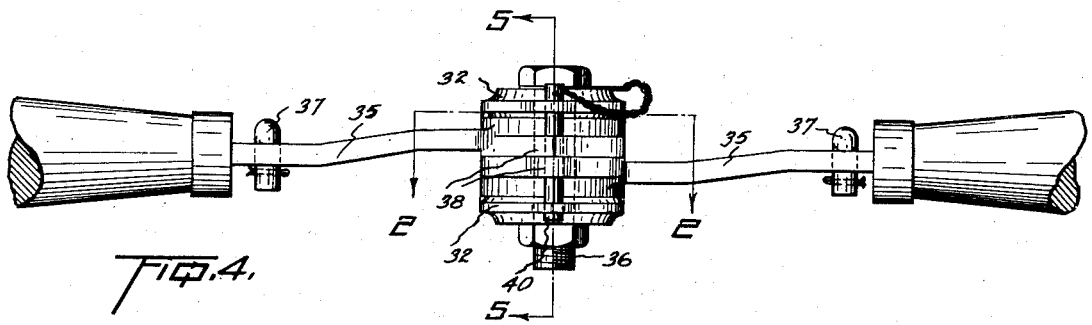
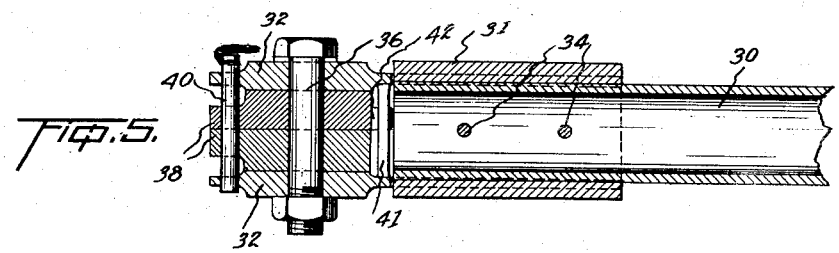
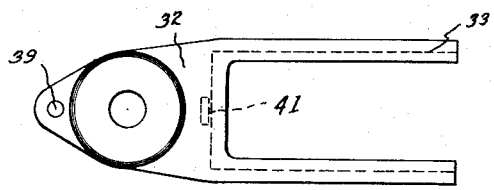  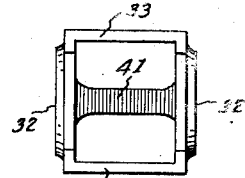
  
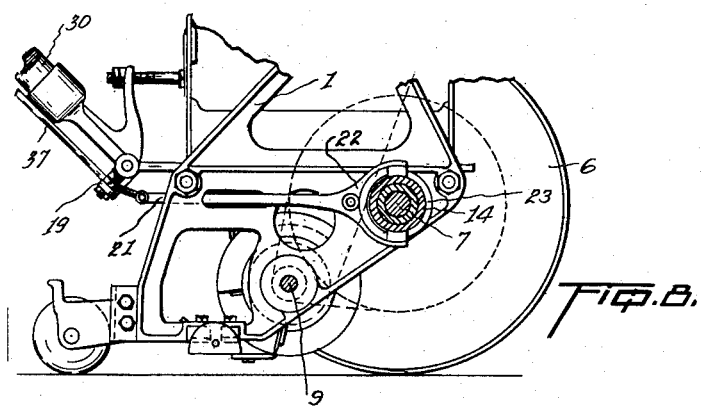
Inventor
Harold L. Blydenburgh
By
Attorney Patented Oct. 28, 1930

1,779,583

UNITED STATES PATENT OFFICE

HAROLD L. BLYDENBURGH, OF DETROIT, MICHIGAN, ASSIGNOR TO THE MOTO-MOWER COMPANY, OF DETROIT, MICHIGAN, A CORPORATION OF MICHIGAN

DRIVE CONTROL FOR MOTOR-DRIVEN LAWN MOWERS

Application filed September 26, 1927. Serial No. 222,144.

The present invention pertains to a novel drive control for motor driven lawn mowers of the type disclosed in the patent of Perry E. Mack, No. 1,554,744 of Sept. 22, 1925.

In this style of motor driven lawn mower the cutter shaft is geared permanently to the motor and there are provided separate and independent clutch devices for connecting the ground engaging wheels to the motor. Thus, one of the wheels may be geared to the motor while the other remains disconnected, whereby the machine will be operated to make a left hand or a right hand turn as desired.

The object of the present invention is to arrange these clutch controls in such a manner that the driving of the machine will respond properly to the ordinary manual forces which would naturally be applied to a lawn mower of the domestic type not equipped with a motor. When it is desired to steer a manual mower to the right, the left handle bar is pushed forward with more force than the right bar, and a similar operation is performed in steering the mower to the left. In the present invention the handle bars are independently connected to the clutches of the corresponding wheels in such a manner that a greater forward pressure on the left bar and a relative retraction of the right bar will connect the left wheel to the motor and disconnect the right wheel therefrom so that the machine will be turned to the right as if it were entirely propelled by hand. A similar mode of operation applies in steering the machine to the left.

If both handles are pushed forwardly both wheels will be connected to the motor and the machine will move straight ahead. If both handle bars are retracted for stopping the machine or pulling it backwards, the motor will be disconnected from both wheels, since it is not desired to have the wheels turning forwardly under these conditions.

The invention is fully disclosed by way of example in the following description and in the accompanying drawings, in which—

Figure 1 is a plan view of the machine;
Fig. 2 is a detail sectional view of the handle construction, partly in elevation, the view being taken on line 2—2 of Fig. 4;
Fig. 3 is a detail longitudinal section at one end of the machine;
Fig. 4 is an end view of the handle construction;
Fig. 5 is a section on the line 5—5 of Fig. 4;
Fig. 6 is a plan view of the pivot head;
Fig. 7 is an end view thereof, and
Fig. 8 is a transverse vertical section of the machine, partly in elevation.

Reference to these views will now be made by use of like characters which are employed to designate corresponding parts throughout.

The general construction of the machine, with the exception of the clutch control mechanism, is similar to that disclosed in the above mentioned patent. The framework of the machine includes side frames 1 and 2 connected by tie rods 3 and 4 on which is mounted a platform or cover 5 for supporting a motor which need not be illustrated in the present instance. A pair of ground engaging wheels 6 are mounted at the ends of the framework, exteriorly of the members 1 and 2 and are rotatable on axles 7 secured to said members. A cutter shaft 8 carrying the usual cutter blades (not shown) is journaled between the frame members 1 and 2 and is formed at each end with a projection 9 extending into the adjacent wheel 6 and equipped with a small sprocket wheel 10, the purpose of which will presently be described. The cutter shaft proper carries a larger sprocket wheel 11 by means of which it is geared to the motor previously mentioned.

Each wheel 6 has a hub 12 surrounding the corresponding axle 7 and carries a friction clutch disk 13 as shown more clearly in Fig. 3. The hub is surrounded loosely by a slidable sleeve 14 formed with a disk 15 lying adjacent and parallel to the member 13. Between the two disks is disposed a sprocket wheel 16 which is fixed relatively to the wheel when the disks 13 and 15 are brought together by the means presently to be described. The sprockets 10 and 16 are chained together so that power may be transmitted from the cutter shaft to the wheel 6, subject to the condition of the clutch. The clutch is normally maintained in engaging position by means of a spring device 17 for drawing the disks 13 and 15 together as fully described in the above mentioned patent.

To the cover 5 is secured a bracket 18 having two rocker arms 19 pivoted at opposite sides of an axis drawn centrally between the two ground wheels 6. Each frame member 1 and 2 carries a small bracket 20 to which is pivoted a lever 21 having one end formed as a fork 22 straddling the corresponding sleeve 14. This fork is adapted, when moving inwardly, to abut a nut 23 fixed on the sleeve 14 whereby to open the clutch against the action of the spring device 17. When moved in the opposite direction it has no effect and merely permits the spring device to lock the clutch. The remaining end of the lever 20 is joined to one of the ends of the nearer rocker arm 19 by a link 24 as shown in Fig. 1.

A handle rod 30 extends rearwardly from the bracket 18 and is fitted at its outer end with an enlargement 31. A pivot head comprising a pair of spaced ears 32 and fingers 33 is slipped over the enlargement 31 in such a manner that the fingers are positioned at the corners of the enlargement as may be seen in Figs. 1 and 5. The head is secured to the handle rod in any suitable manner as by means of pins 34 passed through the handle and fingers 33.

Between the ears 32 are placed the ends of handle bars 35, and a pivot pin 36 is passed through these parts. The mounting of the bars in the pivot head is such that they may be swung towards and away from the body of the machine. The bars are joined to the remaining ends of the corresponding rockers 19 by links 37.

The application of power from the motor to the ground engaging wheels is controlled through the friction clutches 15, 17, the rocker arms 19, and the linkages 20—24 in the manner described in the aforementioned patent. The initial movement in the clutch control is however, somewhat different and is effected by the pivotal movement of the bars 35. In the normal running of the machine, both bars are pushed inwardly and they permit the clutches to remain engaged so that the ground wheels 6 are driven from the cutter shaft. The natural manner of steering a manual motor, for example, to the right, is to maintain the pressure on the left hand bar 35 and to retract the right hand bar. When the handle bars of the present device are operated in this manner, the pressure on the left hand bar will retain the left hand wheel in connection with the motor, and the retraction of the right hand bar will disconnect the right wheel from the motor, as the result of which the machine will be steered to the right. The steering of the machine to the left is effected in a similar manner. If both bars are retracted, as in the case of pulling a manual mower backward, the clutches will be opened and the wheels will cease to rotate.

For the purpose of holding the clutch disks retracted from the ground wheels so that the machine may be pushed from place to place when the engine is not running, the pivoted ends of the bars 35 are formed with rearwardly extending ears 38 which may be brought into alinement with apertures 39 at the rear side of the ears 32. A pin 40 passed through the apertures 39 and ears 38 maintains the bars in a retracted position so that the clutches are held released.

Between the ears 32 and at the inner side thereof is a connecting bar 41 which functions as a stop member for lugs 42 projecting inwardly from the inner ends of the bars 35. These lugs, in engaging the stop member, limit the rearward swinging of the bars 35 as is apparent in Fig. 2.

As will be understood, the position of the handle bars 35, in Figs. 1 and 2, is the rearmost position of these bars, since stop 41 prevents further rearward movement of either handle bar; in this position the clutch members 15 are in their withdrawn position with the clutch mechanisms rendered inactive. If pin 40 be inserted at this time, the bars will remain in this position; in the absence of the pin, the spring elements 17 tend to move the bars forwardly and complete the clutch activity, so that the latter condition can be considered as the normal condition. The ability to render the clutches inactive by simply drawing the handle bars rearwardly, and then lock them in this position is of advantage, not only in permitting the mower to be readily moved about manually, but also when it is desired to start the motor, the mower remaining stationary under these conditions and lessening the weight to be moved at the starting.

With the motor in operation and with the gears 16 rotating, the removal of pin 40 permits the bars to be advanced to provide clutch engagement. In this movement both bars are moved concurrently forward about the pivot point in the same direction relative to the fore and aft direction of the mower, although the movement of the bars relatively is in opposite directions rotatively with respect to the pivot. As soon as the clutches become active, the mower advances under power of the motor and there is no need of applying pressure on the bars. Obviously, if the handles be concurrently drawn rearwardly, the same conditions are present excepting that the movement of the bars is now rearward or in the aft direction, but the movements of the bars relatively is in opposite directions rotatively with respect to the pivot, as in the forward movement; such rearward movement can be had by actually drawing the bars rearward, or simply holding them while the motor advances the mower until the clutches become inactive.

The conditions change somewhat when a turn is to be made. At such time, both handle bars are advanced with respect to the position of Fig. 2, since the clutches are in engagement. When the turn is to be made, the operator advances the bar on that side of the handle instrumentality on which he would apply pressure in the usual solid handle structures, and at the same time draws the other handle bar rearward—also as would be the case with the usual solid handle structure. The resultant action is that of rendering inactive the clutch of the wheel on the side on which the bar was drawn rearward leaving the clutch on the opposite side active so that the power of the motor remains effective to drive the outer wheel which would be advanced by the forward pressure which would be placed on the side of the usual solid structure.

During this latter action, the handle bars are moved concurrently, but they now move in opposite directions relative to a fore and aft direction of the motor, but in the same direction rotatively with respect to the pivot.

This series of actions conform generally to those which are normally present in the ordinary lawn mower without power, and are therefore the natural actions of an operator, so that there is no necessity for careful study in advance of handle manipulation. And they are made possible by the fact that the clutch actuating members 21 are active in moving the clutch in but one direction; hence, the advance of one of the handle bars in making the turn is itself of no operating effect on the particular clutch—then in engagement—but does have the positive effect of dispensing with a specific selection condition on the part of the operator who unconsciously provides the advance of this bar in carrying out what he would do with the ordinary lawn mower. Of course, when the bars are in locked position with the pin 40 in place, the pair of bars become the equivalent of the ordinary handle, but with the wheels free. The mower would then be moved about like an ordinary mower and in making the turns the above natural action would be carried out.

Although a specific embodiment of the invention has been illustrated and described, it will be understood that various alterations in the details of construction may be made within the scope of the invention as indicated by the appended claims.

What I claim is:—

1. In a power-driven wheeled device, wherein the drive wheels are operatively connected to the power source by clutch mechanisms individual to each wheel with the mechanisms normally active, and wherein steering of the device is controlled by a handle instrumentality operatively connected to the clutch mechanisms individually to permit clutch activity or inactivity of the mechanisms collectively or individually at will, the combination of said clutch mechanisms, and said handle instrumentality operatively connected to the clutch mechanisms by individual connections, said instrumentality including a pair of overlapping handle members individually movable relative to a pivot extending through the overlapping portions to form a pivot common to the members, the operative connection between a clutch mechanism and the instrumentality extending solely to one of the pair of members, the position of the pivot relative to the members and of said members relative to each other being such that when both members of the pair are moved concurrently relative to the pivot in opposite directions rotatively concurrent activity or inactivity of the clutch mechanisms will be provided and when moved concurrently in the same direction rotatively relative to the pivot one of the clutch mechanisms will be rendered inactive.

2. A structure as in claim 1 characterized by means in the path of movement of the members to limit movement of the members in one direction.

3. A structure as in claim 1 characterized by means in the path of movement of the members to limit movement of the members in one direction, means being provided to permit locking of the members at will in such limit position.

4. A structure as in claim 1 characterized by means in the path of movement of the members to limit movement of the members in the direction rendering the clutch mechanisms inactive, means being provided to lock the members at will in such position, whereby said members may serve as a rigid handle bar for moving the device with the wheels running free.

5. In a power-driven lawn mower, wherein the drive wheels are operatively connected to the power source by clutch mechanisms individual to each wheel with the mechanisms normally in clutch engagement, and wherein steering of the mower is controlled by a rearwardly-extending handle having means operatively connected to the clutch mechanisms individually to permit clutch activity or inactivity of the mechanisms collectively or individually at will, the combination of said clutch mechanisms, the rearwardly-extending handle, and the means carried thereby, said means including a pair of handle members having an overlapping relation relative to a pivot extending through the overlapping members to form a pivot common to the members, the operative connection from a clutch mechanism to said means extending solely to one of said members, the position of the pivot relative the members and of said members relative to each other being such that when both members are moved concurrently in the same direction relative to the fore and aft direction of the mower concurrent activity or inactivity of the clutch mechanisms will be provided and when said members are moved concurrently in the same rotative direction relative to the pivot one of the clutch mechanisms will be rendered inactive.

6. A structure as in claim 5 characterized by means in the path of movement of the members to limit member movement in the rearward direction.

7. A structure as in claim 5 characterized by means in the path of movement of the members to limit member movement in the rearward direction, means being provided to lock the members at will in such position with the clutch mechanisms inactive, whereby said members may serve as a rigid handle bar for moving the mower with the wheels running free.

8. A structure as in claim 5 characterized in that the handle carries an eared element within which the members are pivoted in the overlapping relation, said element carrying a stop element, each handle member having a face adapted to abut the stop element when the member is moved to a predetermined position in its rearward travel.

9. A structure as in claim 5 characterized in that the handle carries an eared element within which the members are pivoted, the ears of the element and the respective members having openings adapted to be alined when the members are in their rearward positions, and a pin adapted to be inserted in the alined openings for retaining the handle members in such position with the clutch mechanisms inactive.

10. In a power-driven lawn mower, wherein the drive wheels are operatively connected to the power source by clutch mechanisms individual to each wheel with the mechanisms normally in clutch engagement, and wherein steering of the mower is controlled by a rearwardly-extending handle having means operatively connected to the clutch mechanisms individually to permit clutch activity or inactivity of the mechanisms collectively or individually at will, the combination of said clutch mechanisms, the rearwardly-extending handle, and the means carried thereby, said means including a pair of handle members pivotally carried by the handle to swing individually in a fore and aft direction of the mower, the operative connection from a clutch mechanism to said means extending solely to one of said members, the pivoting relation of the members and the relation of the members to each other being such that when both members are moved concurrently in the same direction relative to the fore and aft direction of the mower concurrent activity or inactivity of the clutch mechanisms will be provided and when said members are moved concurrently in relative opposite directions relative to such fore and aft direction one of the clutch mechanisms will be rendered inactive.

In testimony whereof I affix my signature.

HAROLD L. BLYDENBURGH.